United States Patent [19]
Toman et al.

[11] 3,754,262
[45] Aug. 21, 1973

[54] MICROWAVE AIRCRAFT GUIDANCE SYSTEM

[75] Inventors: Donald J. Toman, Pleasantville, N.Y.; Warren Hundley, Upper Saddle River, N.J.

[73] Assignee: Tull Aviation Corporation, Armonk, N.Y.

[22] Filed: Apr. 24, 1972

[21] Appl. No.: 247,188

Related U.S. Application Data

[63] Continuation-in-part of Ser. No. 54,456, July 13, 1970, abandoned.

[52] U.S. Cl. ............ 343/108 R, 325/461, 343/102, 343/107
[51] Int. Cl. ............................................. G01s 1/14
[58] Field of Search ............... 343/102, 107, 108 R; 325/461

[56] References Cited
UNITED STATES PATENTS

| | | | |
|---|---|---|---|
| 2,254,218 | 9/1941 | Halstead | 325/461 |
| 2,859,440 | 11/1955 | Begovich et al. | 343/107 |
| 3,471,856 | 10/1969 | Laughlin, Jr. et al. | 343/105 R |

Primary Examiner—Benjamin A. Borchelt
Assistant Examiner—Richard E. Berger
Attorney—Curtis Ailes

[57] ABSTRACT

A microwave ILS system which is compatible with a conventional ILS system, including a microwave receiver having a converter operable by subtraction of a predetermined frequency to convert a pair of complementary sub-band portions of a predetermined band of microwave frequencies to conventional ILS system frequencies respectively for localizer and glide slope functions. The receiver includes means for selectively changing the conversion of the microwave frequency signals to select different pairs of complementary sub-band portions of the predetermined band of microwave frequencies for conversion to the conventional localizer and glide slope function frequencies.

20 Claims, 3 Drawing Figures

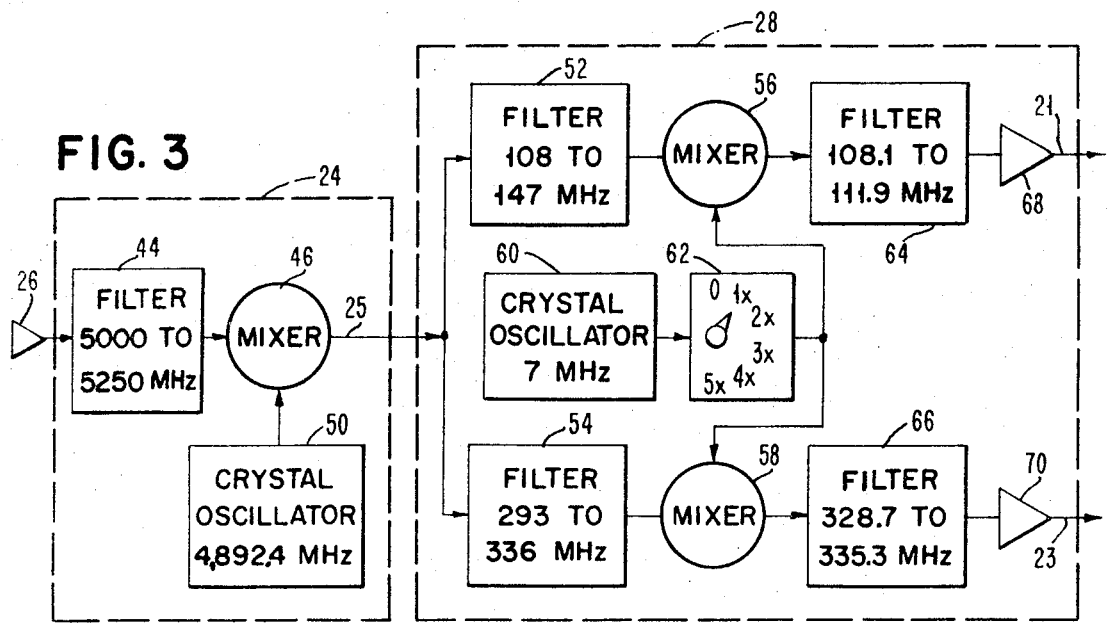

MICROWAVE AIRCRAFT GUIDANCE SYSTEM

This is a continuation in part of application Ser. No. 54,456 filed on July 13, 1970 for a guidance system, now abandoned.

This invention relates to guidance systems, and to guidance systems which are particularly useful for aircraft and which may be operated at microwave frequencies. The systems of the present invention are particularly useful for the guidance of aircraft in descent towards an airport for landing. Accordingly, the invention is described in terms of this function. However, it will be understood that the invention is also very useful in guiding aircraft in a descending path which may not necessarily be intended as a landing approach descent, or in an ascending path which may or may not be an ascent related to take-off from an airport. Furthermore, the invention is also useful for guidance functions such as the azimuth guidance of aircraft, water craft, or land craft with relation to a ground station transmitter.

Present aircraft instrument landing systems, sometimes referred to an ILS, are operable at very high frequencies (VHF) frequencies. These present systems represent a large existing investment in airport ground installations and also in aircraft equipment installations. However, at the VHF frequencies, there are many airport sites where the conventional ILS simply cannot be operated successfully because of the problems of reflections of signals which make the transmitter signals ambiguous and unusable to the aircraft. Furthermore, the VHF systems are very expensive, which further limits the number of installations, and prevents installations at many airports where they are needed.

Accordingly, it is one object of the present invention to provide an improved low-cost microwave aircraft guidance system which can be effectively used at otherwise difficult airport sites.

Another problem with present ILS systems is that only a limited number of VHF-ILS channels are available and this can create a problem, particularly for congested metropolitan areas having many airports and many runways with ILS installations. Since the assigned VHF-ILS navigational aid band is sandwiched between the FM braodcast band and the aeronautical mobile communication band, the option of merely widening the present band to provide additional frequencies at VHF is not available.

Accordingly, it is another important object of the present invention to provide additional channels for instrument landing service to thereby permit additional installations and more effective discrimination and identification of particular instrument equipped landing strips in crowded areas.

The present ILS systems are quite effective in some locations, and they represent a very large investment in airport ground installations, and particularly in aircraft equipment installations.

Accordingly, it is another object of the present invention to provide an improved instrument landing system which may employ microwave frequencies while at the same time providing for compatibility of the aircraft equipment with conventional ILS equipment, permitting the continued reception of conventional ILS signals at VHF, and permitting the use of existing ILS receiver equipment as a part of the new microwave system of this invention.

In carrying out the invention there is provided an improved guidance system comprising apparatus for a craft to be guided including a guidance function receiver operable to receive guidance signals in a first predetermined band of frequencies and operable in response to said guidance signals for generating a signal indicating deviations from a predetermined path. A means is connected to said receiver for indicating said deviation signals for course corrections. A microwave receiver is provided which is operable to receive guidance signals within a predetermined band of microwave frequencies from ground stations, said microwave receiver including a frequency converter comprising means operable to convert microwave frequency signals received by said microwave receiver by subtraction of a fixed frequency. A frequency translator is connected from said microwave receiver to said guidance function receiver, said frequency translator being operable upon the signals converted by said frequency converter to translate a selected sub-band portion of said converted predetermined band of microwave frequencies to said first predetermined band of frequencies for said guidance function receiver, said translator being operable for the selection of any one of a plurality of sub-band portions by displacement of the signals converted by said frequency converter by any selected one of a plurality of multiples of a second fixed frequency.

Figure 1:
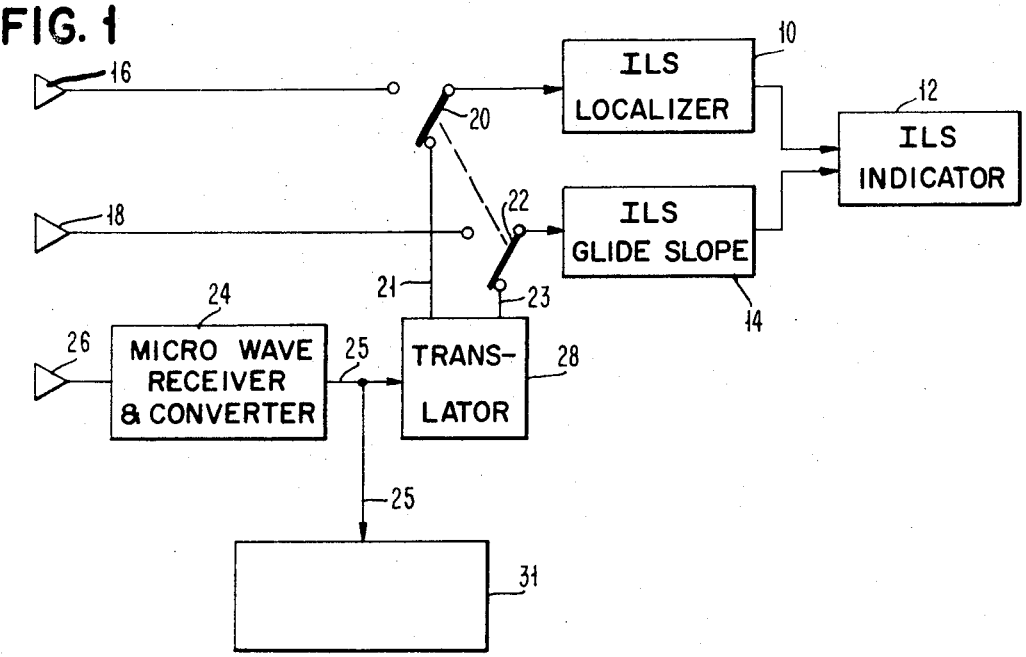
FIG. 1 is a schematic circuit diagram showing the arrangement of a receiver system for installation in an aircraft for carrying out the present invention.

And FIG. 3 is a more detailed schematic circuit diagram illustrating preferred features of the microwave receiver and converter, and the frequency translator which may be employed in the system of FIG. 1.

Throughout this specification, reference is made to airport ground stations. However, it will be understood that the invention is usable for descent (or ascent), or course guidance functions, transmitted from ground stations which are not necessarily located at airports, and which may be usable for water craft or land craft as well as aircraft.

Referring more particularly to FIG. 1, a preferred system in accordance with the present invention is illustrated to include an ILS localizer receiver 10 and an ILS glide slope receiver 14. Both of these receivers feed signals to an ILS indicator 12. The localizer receiver 10 is operable in the normal VHF localizer frequencies in the band from 108 to 112 MHz. Such signals may be recieved from a localizer antenna 16 through a switch schematically shown at 20. The glide slope receiver is operable to receive signals at the usual glide slope frequency band from 328.6 to 335.4 MHz. Such signals may be received from a glide slope antenna 18 through a switch element schematically shown at 22 and operable together with the switch element 20. With the exception of the switch elements 20 and 22, the components of the system thus far described may be conventional ILS components.

In accordance with the present invention, a microwave receiver and converter 24 is provided and connected to receive microwave ILS signals through a microwave antenna 26. The microwave signals include signals which are in conventional ILS format and they are converted within the receiver-converter 24 and in a translator 28 to signals which fall within the conventional glide slope and localizer frequency bands. Thus, these signals can be supplied directly to the localizer and glide slope receivers 10 and 14 through connections 21 and 23 and the switches 20 and 22. Signals within the same microwave frequency band may also be received and converted by the receiver 24 and supplied through connection 25 to another navigational aid apparatus 31. Apparatus 31 may comprise a system which is a complete substitute for the localizer 10-glide slope 14 system and which provides more sophisticated navigational or landing aids. On the other hand, the apparatus 31 may simply supplement the information available from the localizer and glide slope receivers 10 and 14. For instance, the apparatus 31 may be a distance measuring equipment and may employ a portion of the microwave frequency band received by receiver 24 which is not required for the ILS localizer and glide slope functions. The terms "guidance" and "guidance system" are used in this specification to refer to all radio frequency systems by which information is transmitted and received which is useful in the guidance of a craft. This includes all of the functions described above, as well as other similar functions. At least some of these functions are also referred to from time to time as navigation functions, and the systems as navigation systems.

Certain bands of microwave frequencies have been set aside and allocated for guidance functions. These include the C band from 5,000 to 5,250 MHz, and the Ku band from 15,400 to 15,700 MHz. The preferred embodiment of this invention is described in this specification in terms of operation in the C band. However, it will be understood that the invention may be employed also for operations at Ku band, or at some other microwave frequency which may be available for this purpose. Both the C band and the Ku band are each wide enough to encompass a range of frequencies having an absolute difference between the lowest and highest frequency within the band which exceeds the difference between the lowest frequency in the conventional localizer band and the highest frequency in the conventional glide slope band. Thus, a simple conversion by a simple frequency subtraction in the C band receiver and converter 24 is sufficient to convert the C band localizer and glide slope signals to the appropriate respective frequencies for use in the localizer and glide slope receivers 10 and 14. This statement is true only if the localizer and the glide slope signals are transmitted within appropriate matched sub-bands within the microwave band received by the receiver 24. Appropriate sub-bands for this purpose are illustrated for instance in FIG. 2 at 30 and 32.

The localizer signals may be transmitted in the sub-band 30 from 5,000.4 to 4,004.4 MHz, the glide slope signals may be transmitted in the complementary sub-band 32 from 5,221.0 to 5,227.8 MHz. These frequency limits for the sub-bands 30 and 32 are shown above the representation of the bands in FIG. 2. The frequency conversion within the receiver 24 consists of a simple subtraction of 4,892.4 MHz, resulting in a converted subband 30 in the range from 108.0 to 112.0 MHz, and a converted sub-band 32 in the range from 328.6 to 335.4 MHz. These frequency bands correspond to the conventional VHF bands for the localizer and glide slope functions.

Figure 2:
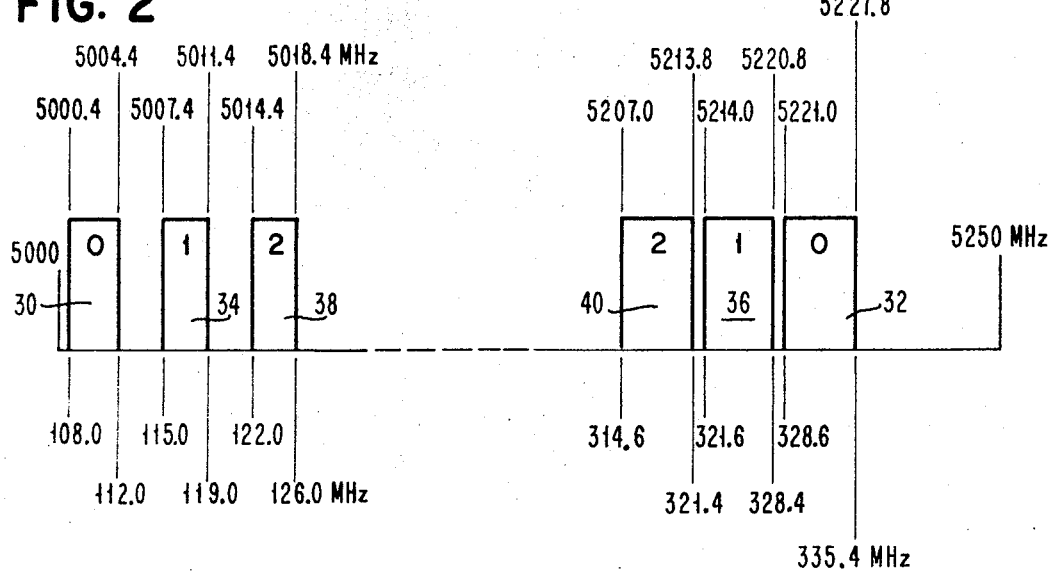
FIG. 2 is a chart illustrating a particular allocation of frequencies which may be employed in carrying out the principles of the invention.

The translator 28 of FIG. 1 provides for the employment of other paired sub-bands by adding and subtracting 7 MHz frequency increments with the converted C band signals. Thus, as illustrated in FIG. 2 at 34, localizer signals may be transmitted in the sub-band from 5,007.4 to 5,011.4 MHz, and when converted they result in localizer signals in a converted band from 115.0 to 119.0 MHz. By subtracting seven MHz from these signals in translator 28, they are translated to the conventional localizer frequency band from 108.0 to 112.0 MHz. A paired sub-band for transmission of glide slope signals is shown at 36 in the range from 5,214.0 to 5,220.8 MHz. When this sub-band is converted in the receiver and converter 24, the resultant signals are in a converted sub-band from 321.6 to 328.4 MHz. By adding 7 MHz to these signals in translator 28, they are translated to the conventional glide slope signal band from 328.6 to 335.4 MHz. Thus, sub-bands 34 and 36 are complementary subbands, the same integral multiple (1) of 7 MHz being subtracted from sub-band 34 and added to sub-band 36 to obtain the conventional localizer and glide slope frequencies. By the same process, additional multiples of seven MHz may be added and subtracted in the translator to provide additional complementary sub-bands. For instance, the sub-bands 38 and 40, are based respectively upon the subtraction and addition of 14 MHz (the second integral multiple of seven) in the translator 28. By this simple means, as many complementary frequency sub-bands may be provided as are needed. It is proposed for instance to provide a total of six pairs of complementary microwave subbands. Since thirty-nine pairs of channels may be selected by the conventional localizer and glide slope receivers 10 and 14 from each pair of sub-bands, this system will provide 234 new ILS channels in a microwave frequency band in addition to the thirty-nine ILS channels already available at the conventional VHF transmission frequencies.

It is quite apparent that the frequency allocations suggested by FIG. 2 for the ILS functions leave quite a bit of the C band from 5,000 to 5,250 MHz unused. Accordingly, it is contemplated that the additional apparatus 31 supplied through connection 25 may employ these otherwise unused portions of the C band for other guidance signal functions such as for distance measurement equipment. As another alternative, the equipment 31 may completely replace the ILS function and the microwave signals received and converted in receiver 24 may include information represented by forms of modulation such as frequency modulation which are different from the amplitude modulation presently used for the ILS functions. Thus, the same microwave band may be employed both for conventional ILS amplitude modulated signals and for frequency modulated signals for more sophisticated guidance systems — while maintaining complete compatibility with the existing ILS system.

FIG. 3 is a more detailed schematic diagram showing the C band antenna 26, the receiver and converter 24, and the translator 28. The receiver 24 is shown to include a filter 44 to limit the input signal to the C band from 5,000 to 5,250 MHz, and a mixer 46 in which the signal is mixed with the output from a crystal oscillator operating at 4,892.4 MHz to obtain difference frequencies on the receiver and converter output at 25. This output is provided to the translator 28.

The signals at 25 are fed to two separate channels within translator 28 beginning with the filters 52 and 54. Filter 52 is a band pass filter which passes all of the sub-bands for the localizer signals, all of these sub-bands being encompassed in the frequency range from 108 to 147 MHz. Similarly, the filter 54 limits its associated channel to a range from 293 to 336 MHz encompassing all of the sub-bands for the glide slope signals. Particular sub-bands are then selected by providing different translator frequencies to the mixers 56 and 58. These different translator frequencies are provided from a crystal oscillator 60 operating at 7 MHz and a frequency multiplier 62 which may be selectively operated to multiply by a factor of 0 through 5 to thereby select pairs of sub-bands designated by those factor numbers. When the multiplier 62 is set on zero to select the zero sub-bands, the frequency translator circuit is turned off so that there is no addition or subtraction of frequency in the translator. While this portion of the translater has been described in terms of a variable frequency multiplier, it will be understood that it is an appropriate alternative to provide, for instance a 35 MHz oscillator and a frequency divider which may be selectively operated to divide by different factors to provide the appropriate frequency translation corrections.

The translator 28 also preferably includes output filters 64 and 66 designed respectively to pass the conventional localizer and glide slope frequency bands for transmission to the localizer and glide slope receivers at connections 21 and 23. If necessary, amplifiers 68 and 70 may be provided.

While FIGS. 2 and 3 have been described in terms of a translator which operates with uniform 7 MHz intervals, it will be apparent that it would be practical to provide a system in which two different translation increment frequencies might be employed. Thus, the 7 MHz interval might be used for separation of the glide slope sub-bands, and some lesser interval such as 4 MHz might be used for separation of the localizer sub-bands. Furthermore, while the invention is described in terms of employing a first complementary pair of sub-bands 30 and 32 which require no translation frequency change, it is possible to employ only subbands which are subjected to translation frequency changes, and to omit the outermost complementary pairs of sub-bands. In this way, the total spectrum space spanned by the complementary sub-bands is confined to a smaller total fraction of the C band. These modifications of the invention are not specifically illustrated.

The crystal oscillator 50 must be extremely accurate for the satisfactory operation of the system. This is a particularly critical element for systems which are operated at Ku band. A preferred approach to this problem, particularly with Ku band operations, is to stablize the crystal oscillator 50 by means of a fixed standard frequency signal from a ground station, which may be the same ground station transmitting the guidance signals. This feature constitutes subject matter which is described and claimed in co-pending patent application Ser. No. 54,510 filed July 13, 1970 by Donald J. Toman for a SYSTEM FOR GUIDANCE, and assigned to the same assignee as the present application.

The ground station transmitter or transmitters have not been shown or described in detail. They may be constructed and may operate in a conventional manner, the ILS signals being generated in the usual ILS format, but with the exception that transmission is at microwave frequencies. Typically, two transmitters may be employed, including a glide slope transmitter which is located at the end of the runway first approached by the aircraft, and a separate localizer transmitter which may be located beyond the far end of the runway (the "roll-out" end) to provide for the localizer function during touchdown and roll-out. Alternatively, a single transmitter apparatus may be employed for all of the transmitter functions and located at the near end of the runway. This may be desirable for economy and portability of the apparatus, but it does not provide the localizer function during touchdown. In this paragraph, the references to transmitter locations are understood to pertain primarily to the transmitter antenna locations. However, with microwave equipment, the antenna and the rest of the transmitter system are generally located together.

As explained above in connection with FIG. 2, the frequency conversion which is carried out in the converter included in the microwave receiver 24 of FIG. 1 is effective to directly convert microwave sub-band frequencies represented by the sub-bands 30 and 32 into the standard ILS localizer and glide slope frequencies. Thus, for those two complementary sub-bands 30 and 32 (also referred to above as the "zero" channel), the function of the translator 28 is not required, and the translator may be omitted if no additional sub-band channels are required.

It is apparent that different pairs of complementary sub-bands may be transmitted and selected in the receiver 24 by simply changing the local oscillator frequency of the converter included within the receiver 24, provided the members of the other pairs of complementary sub-bands are both displaced in frequency in the same direction. Thus, if the glide slope sub-band 36 in FIG. 2 is moved to a position above the sub-band 32, for instance, in the frequency band from 5228.0 MHz to 5234.8 MHz, a simple shift of 7 MHz in the oscillator of the converter included in the microwave receiver 24 will be effective to select the number 1 sub-band pair 34 and 36 instead of the zero sub-band pair 30 and 32. By this means, the function of the separate translator apparatus 28 is fulfilled within the microwave receiver and converter 24.

It is necessary, however, to provide some means for changing the frequency of the oscillator within the microwave receiver 24. This is the oscillator designated at 50 in FIG. 3. This can be carried out in various eays, such as by voltage tuning of the oscillator, side-step techniques, or by switching to different crystals which are operable at the desired offset frequencies to thereby select different sub-bands. Employing this technique, there is space for four pairs of sub-bands with the center-to-center separation of adjacent sub-bands of 7 MHz without exceeding the upper limit of the microwave band at 5250 MHz.

In this modification, it is apparent that the translator 28 may be eliminated. Stated another way, the translator 28 is functionally combined in the converter of the receiver 24. In one mode of carrying out this modification, the translator is effectively moved into the receiver-converter 24 and connected between the oscillator 50 (in FIG. 3) and the mixer 46 to selectively translate the frequency of the oscillator 50 as seen by the mixer 46.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. An improved aircraft guidance system comprising apparatus for the aircraft including
   a localizer receiver operable to receive guidance signals in a first predetermined band of frequencies and operable in response to said guidance signals for generating a signal indicating lateral deviations from a predetermined flight path,
   a glide slope reciever operable to receive guidance signals in a second predetermined band of frequencies and operable in response to said guidance signals for generating signals indicating vertical deviations from a predetermined glide slope path,
   means connected to said localizer receiver and to said glide slope receiver for indicating said localizer and glide slope deviation signals for course corrections,
   a microwave receiver operable to receive localizer and glide slope guidance signals within a predetermined band of microwave frequencies from ground stations,
   said microwave receiver including a frequency converter comprising means operable to convert microwave frequency signals received by said microwave receiver by subtraction of a fixed frequency,
   a frequency translator connected from said converter to said localizer and glide slope receivers,
   said frequency translator being operable upon the signals converted by said frequency converter to translate different complementary sub-band portions of said converted predetermined band of microwave frequencies to said first and second predetermined bands of frequencies respectively for said localizer and glide slope receivers.

2. A system as claimed in claim 1 wherein
   the frequency translation is accomplished by frequency displacements,
   the displacement of the lower complementary sub-band portion being upward and the displacement of the upper sub-band portion being downward.

3. A system as claimed in claim 2 wherein
   said complementary sub-band portions are both displaced in frequency by the same multiple of a second fixed frequency within said predetermined band of microwave frequencies,
   and said multiple of said second fixed frequency is selectable for thereby selecting particular ones of said complementary sub-band portions.

4. A system as claimed in claim 3 wherein
   said predetermined band of microwave frequencies is at least wide enough to encompass a range of frequencies such that the difference between the lowest and highest frequencies within said microwave frequency band is greater than the difference between the lowest and highest frequencies included within said first and second predetermined bands of frequencies.

5. A system as claimed in claim 1 wherein
   an additional navigational aid apparatus is connected to receive signals from said microwave receiver and frequency converter to provide navigational aid functions.

6. A system as claimed in claim 5 wherein
   said additional navigational aid apparatus is a distance measurement equipment.

7. A system as claimed in claim 1 wherein
   there is included apparatus for a ground station having a microwave localizer transmitter adapted for installation at the roll-out end of an airport runway, and a separate glide slope microwave transmitter adapted for installation at the approach end of the same airport runway.

8. A system as claimed in claim 1 wherein
   there is included apparatus for a ground station having a combined microwave localizer transmitter and glide slope transmitter.

9. A improved guidance system comprising apparatus for a craft to be guided including
   a guidance function receiver operable to receive guidance signals in a first predetermined band of frequencies and operable in response to said guidance signals for generating a signal indicating deviations from a predetermined path,
   means connected to said receiver for indicating said deviation signals for course corrections,
   a microwave receiver operable to receive guidance signals within a predetermined band of microwave frequencies from ground stations,
   said microwave receiver including a frequency converter comprising means operable to convert microwave frequency signals received by said microwave receiver by subtraction of a fixed frequency,
   a frequency translator connected from said microwave receiver to said guidance function receiver,
   said frequency translator being operable upon the signals converted by said frequency converter to translate a selected sub-band portion of said converted predetermined band of microwave frequencies to said first predetermined band of frequencies for said guidance function receiver,
   said translator being operable for the selection of any one of a plurality of sub-band portions by displacement of the signals converted by said frequency converter by any selected one of a plurality of multiples of a second fixed frequency.

10. A system as claimed in claim 9 wherein
    there is provided a second guidance function receiver operable to receive navigation signals in a second predetermined band of frequencies and operable in response to said guidance signals for generating signals indicating deviations from a predetermined path,
    said means for indicating deviation signals being connected also to said second guidance function receiver to provide deviation signals for course corrections,
    said frequency translator being connected from said microwave receiver to said second guidance function receiver,
    said frequency translator being operable upon the signals converted by said frequency converter to translate different selected complementary sub-band portions of said converted predetermined band of microwave frequencies to said first and second predetermined bands of frequencies respectively for said guidance function receivers, said translator being operable for the selection of any one complementary pair of a plurality of pairs of sub-band portions by displacement of the signals converted by said frequency converter by the same selected one of a plurality of multiples of a second fixed frequency.

11. An improved aircraft guidance system comprising apparatus for the aircraft including a guidance function receiver operable to receiver azimuth guidance signals in a first predetermined band of frequencies and operable in response to said azimuth guidance signals for generating a signal indicating deviations from a predetermined flight path, means connected to said receiver for indicating said path deviation signals for course corrections, a microwave receiver including a frequency converter comprising means operable to convert microwave frequency signals received by said microwave receiver by subtraction of a fixed frequency, a frequency translator connected from said converter to said guidance function receiver, said frequency translator being operable upon the signals converted by said frequency converter to translate a selected sub-band portion of said converted predetermined band of microwave frequencies to said first predetermined band of frequencies for said guidance function receiver, said translator being operable for the selection of any one of a plurality of sub-band portions by displacement of the signals converted by said frequency converter by any selected one of a plurality of multiples of a second fixed frequency.

12. An improved aircraft guidance system comprising apparatus for the aircraft including a localizer receiver operable to receive guidance signals in a first predetermined band of frequencies and operable in response to said guidance signals for generating a signal indicating lateral deviations from a predetermined flight path, a glide slope receiver operable to receive guidance signals in a second predetermined band of frequencies and operable in response to said guidance signals for generating signals indicating vertical deviations from a predetermined glide slope path, means connected to said localizer receiver and to said glide slope receiver for indicating said localizer and glide slope deviation signals for course corrections, a microwave receiver operable to receive localizer and glide slope guidance signals within a predetermined band of microwave frequencies from ground stations, said microwave receiver including a frequency converter connected to said localizer and glide slope receivers, said converter comprising means operable by subtraction of a predetermined frequency to convert said microwave frequency signals received by said microwave receiver, said frequency conversion being effective to convert a pair of complementary sub-band portions of said predetermined band of microwave frequencies to said first and second predetermined bands of frequencies respectively for said localizer and glide slope receivers, and means for selectively changing the conversion of said microwave frequency signals to select different pairs of complementary sub-band portions of said predetermined band of microwave frequencies for conversion to said first and second predetermined bands of frequencies respectively for said localizer and glide slope receivers.

13. A system as claimed in claim 12 wherein said means for selectively changing the conversion of said microwave frequency signals comprises a translator connected between said microwave receiver and said localizer and glide slope receivers.

14. A system as claimed in claim 12 wherein said means for selectively changing the conversion of said microwave frequency signals comprises a local oscillator frequency source, said local oscillator frequency source being capable of being changed to provide various selectable oscillator frequencies to thereby select different complementary sub-band portions of said predetermined band of microwave frequencies to provide a plurality of separate localizer and glide slope signal channels within said predetermined band of microwave frequencies.

15. A system as claimed in claim 14 wherein said localizer oscillator frequency source comprises a plurality of crystals to provide the selectable oscillator frequencies, and switching means for interchangeably connecting different ones of said crystals for selecting different frequencies to thereby select different sub-band channels.

16. A system as claimed in claim 14 wherein said local oscillator frequency source comprises a part of said converter.

17. A system as claimed in claim 12 wherein said predetermined band of microwave frequencies is at least wide enough to encompass a range of frequencies such that the difference between the lowest and highest frequencies within said microwave frequency band is greater than the difference between the lowest and highest frequencies included within said first and second predetermined bands of frequencies.

18. A system as claimed in claim 12 wherein an additional navigational aid apparatus is connected to receive signals from said microwave receiver and frequency converter to provide navigational aid functions.

19. A system as claimed in claim 12 wherein there is included apparatus for a ground station having a microwave localizer transmitter adapted for installation at the roll-out end of an airport runway, and a separate glide slope microwave transmitter adapted for installation at the approach end of the same airport runway.

20. A system as claimed in claim 12 wherein there is included apparatus for a ground station having a combined microwave localizer transmitter and glide slope transmitter.

* * * * *